(12) United States Patent
Allen et al.

(10) Patent No.: US 12,552,522 B2
(45) Date of Patent: Feb. 17, 2026

(54) SHOCK STRUT VARIABLE-AREA METERING UNIT

(71) Applicant: Goodrich Corporation, Charlotte, NC (US)

(72) Inventors: Jason Bradley Allen, Waco, TX (US); Kyle M. Madey, Broadview Hts, OH (US)

(73) Assignee: GOODRICH CORPORATION, Charlotte, NC (US)

(*) Notice: Subject to any disclaimer, the term of this patent is extended or adjusted under 35 U.S.C. 154(b) by 391 days.

(21) Appl. No.: 18/187,541

(22) Filed: Mar. 21, 2023

(65) Prior Publication Data

US 2024/0317392 A1    Sep. 26, 2024

(51) Int. Cl.
*F16F 9/512*    (2006.01)
*B64C 25/60*    (2006.01)

(52) U.S. Cl.
CPC ........... *B64C 25/60* (2013.01); *F16F 9/512* (2013.01); *F16F 2230/16* (2013.01); *F16F 2232/08* (2013.01)

(58) Field of Classification Search
CPC . F16F 9/063; F16F 9/342; F16F 9/486; B64C 25/60
USPC .......... 188/322.13, 322.15; 267/64.18, 64.22
See application file for complete search history.

(56) References Cited

U.S. PATENT DOCUMENTS

| | | | | |
|---|---|---|---|---|
| 2,095,112 A | * | 10/1937 | Wallace | B64C 25/60 188/289 |
| 2,161,811 A | * | 6/1939 | Grebe | F16F 9/48 188/320 |
| 2,381,532 A | * | 8/1945 | Focht | B64C 25/60 188/269 |
| 2,637,337 A | | 5/1953 | Martin | |
| 2,868,536 A | * | 1/1959 | Jungles | B64C 25/60 188/317 |
| 5,788,372 A | | 8/1998 | Jones et al. | |
| 6,676,076 B1 | | 1/2004 | Davies | |
| 10,562,614 B2 | | 2/2020 | Cottet et al. | |
| 10,625,849 B2 | | 4/2020 | Mellor | |
| 2009/0218444 A1 | * | 9/2009 | Lahargou | B64C 25/60 244/102 SL |
| 2024/0317392 A1 | * | 9/2024 | Allen | B64C 25/60 |

OTHER PUBLICATIONS

European Patent Office, European Search Report dated Aug. 19, 2024 in Application No. 24165262.7.

* cited by examiner

*Primary Examiner* — Thomas J Williams
(74) *Attorney, Agent, or Firm* — SNELL & WILMER L.L.P.

(57) ABSTRACT

A metering unit is provided. The metering unit includes a metering pin analog and a translation shaft. The metering pin analog is configured to translate about the translation shaft in a first direction in response to a load pressure acting on an annular region of a bottom portion of the metering pin analog. The metering pin analog is configured to translate about the translation shaft in a second direction opposite the first direction in response to the load pressure ceasing.

15 Claims, 5 Drawing Sheets

SHOCK STRUT VARIABLE-AREA METERING UNIT

FIELD

The present disclosure relates generally to aircraft landing systems and, more particularly, to a shock strut variable-area metering unit for aircraft landing gear systems.

BACKGROUND

Shock absorbing devices are used in a wide variety of vehicle suspension systems for controlling motion of the vehicle and its tires with respect to the ground and for reducing transmission of transient forces from the ground to the vehicle. Shock absorbing struts are a common component in most aircraft landing gear assemblies. Shock struts control motion of the landing gear and absorb and damp loads imposed on the gear during landing, taxiing, braking, and takeoff.

A shock strut generally accomplishes these functions by compressing a fluid within a sealed chamber formed by hollow telescoping cylinders. The fluid generally includes both a gas and a liquid, such as hydraulic fluid or oil. One type of shock strut generally utilizes an "air-over-oil" arrangement where a trapped volume of gas is compressed as the shock strut is axially compressed, and a volume of oil is metered through a metering orifice. The gas acts as an energy storage device, similar to a spring, so that upon termination of a compressing force the shock strut returns to its original length. Shock struts also dissipate energy by passing the oil through the orifice so that as the shock absorber is compressed or extended, its rate of motion is limited by the damping action from the interaction of the orifice and the oil.

SUMMARY

Disclosed herein is a metering unit. The metering unit includes a metering pin analog and a translation shaft. The metering pin analog is configured to translate about the translation shaft in a first direction in response to a load pressure acting on an annular region of a bottom portion of the metering pin analog. The metering pin analog is configured to translate about the translation shaft in a second direction opposite the first direction in response to the load pressure ceasing.

In various embodiments, the metering pin analog is positioned within an orifice of an orifice plate. In various embodiments, the orifice plate is positioned within a metering unit housing. In various embodiments, the metering unit housing is positioned between a liquid chamber and a mixed fluid chamber of a shock strut cylinder. In various embodiments, the load pressure is generated in the liquid chamber responsive to a shock strut piston translating a distance into the shock strut cylinder. In various embodiments, rate of translation of the shock strut piston into the shock strut cylinder is controlled by the metering pin analog. In various embodiments, the metering pin analog includes a plurality of variable area flutes machined into an outer circumference of a side portion of the metering pin analog. In various embodiments, each of the plurality of variable area flutes has a first area at a first end of the side portion that transitions to a second area at a second end of the side portion.

In various embodiments, the metering pin analog has a cylindrical configuration defining an inner chamber defined by one or more of the bottom portion, a side portion, and a top portion. In various embodiments, the inner chamber is filled with a meter-out volume of liquid. In various embodiments, as the metering pin analog translates about the translation shaft in the first direction in response to the load pressure acting on the annular region of the bottom portion of the metering pin analog, the meter-out volume of liquid is forced out of the inner chamber through at least one orifice in a metering plate within the inner chamber or a plurality of variable area flutes around an outer circumference of the translation shaft. In various embodiments, the metering unit further includes a return spring. In various embodiments, the return spring is positioned between a retention plate and a top portion of the metering pin analog. In various embodiments, the return spring is configured to force the metering pin analog back to an original position when a shock strut moves to an extended position from a compressed position.

Also disclosed herein is a landing gear assembly. The landing gear assembly includes a shock strut cylinder; a shock strut piston slidably disposed within the shock strut cylinder; and a metering unit. The metering unit includes a metering pin analog and a translation shaft. The metering pin analog is configured to translate about the translation shaft in a first direction in response to a load pressure acting on an annular region of a bottom portion of the metering pin analog. The metering pin analog is configured to translate about the translation shaft in a second direction opposite the first direction in response to the load pressure ceasing.

In various embodiments, the metering pin analog is positioned within an orifice of an orifice plate. In various embodiments, the orifice plate is positioned within a metering unit housing. In various embodiments, the metering unit housing is positioned between a liquid chamber and a mixed fluid chamber of a shock strut cylinder. In various embodiments, the load pressure is generated in the liquid chamber responsive to a shock strut piston translating a distance into the shock strut cylinder. In various embodiments, rate of translation of the shock strut piston into the shock strut cylinder is controlled by the metering pin analog. In various embodiments, the metering pin analog includes a plurality of variable area flutes machined into an outer circumference of a side portion of the metering pin analog. In various embodiments, each of the plurality of variable area flutes has a first area at a first end of the side portion that transitions to a second area at a second end of the side portion.

In various embodiments, the metering pin analog has a cylindrical configuration defining an inner chamber defined by one or more of the bottom portion, a side portion, and a top portion. In various embodiments, the inner chamber is filled with a meter-out volume of liquid. In various embodiments, as the metering pin analog translates about the translation shaft in the first direction in response to the load pressure acting on the annular region of the bottom portion of the metering pin analog, the meter-out volume of liquid is forced out of the inner chamber through at least one orifice in a metering plate within the inner chamber or a plurality of variable area flutes around an outer circumference of the translation shaft. In various embodiments, the metering unit further includes a return spring. In various embodiments, the return spring is positioned between a retention plate and a top portion of the metering pin analog. In various embodiments, the return spring is configured to force the metering pin analog back to an original position when a shock strut moves to an extended position from a compressed position.

Also discloser herein is an aircraft. The aircraft includes a landing gear assembly. The landing gear assembly includes a shock strut cylinder; a shock strut piston slidably disposed within the shock strut cylinder; and a metering unit. The metering unit includes a metering pin analog and a translation shaft. The metering pin analog is configured to translate about the translation shaft in a first direction in response to a load pressure acting on an annular region of a bottom portion of the metering pin analog. The metering pin analog is configured to translate about the translation shaft in a second direction opposite the first direction in response to the load pressure ceasing.

In various embodiments, the metering pin analog is positioned within an orifice of an orifice plate. In various embodiments, the orifice plate is positioned within a metering unit housing. In various embodiments, the metering unit housing is positioned between a liquid chamber and a mixed fluid chamber of the shock strut cylinder. In various embodiments, the load pressure is generated in the liquid chamber responsive to the shock strut piston translating a distance into the shock strut cylinder. In various embodiments, a rate of translation of the shock strut piston into the shock strut cylinder is controlled by the metering pin analog. In various embodiments, the metering pin analog includes a plurality of variable area flutes machined into an outer circumference of a side portion of the metering pin analog. In various embodiments, each of the plurality of variable area flutes has a first area at a first end of the side portion that transitions to a second area at a second end of the side portion.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of embodiments herein makes reference to the accompanying drawings, which show embodiments by way of illustration. While these embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not for limitation. For example, any reference to singular includes plural embodiments, and any reference to more than one component or step may include a singular embodiment or step. Also, any reference to attached, fixed, connected or the like may include permanent, removable, temporary, partial, full and/or any other possible attachment option. Further, any steps in a method discussed herein may be performed in any suitable order or combination.

Disclosed herein is a shock strut variable-area metering unit which mimics a traditional metering pin analog's variable flow area versus stroke. In various embodiments, the variable-area metering unit's shock strut operational orifice area changes as its metering pin analog moves. In various embodiments, the metering pin analog stroke of the variable-area metering unit is only a small fraction of the shock strut's stroke. However, in various embodiments, the metering pin analog's area profile is similar or approximate to a traditional metering pin since the metering pin analog's areas are a function of stroke and the metering pin analog is a function of differential pressure. Therefore, the similarity of the metering pin analog to a traditional metering pin will vary depending on the loading condition. In various embodiments, the metering pin analog's movement and velocity are a function of the shock strut's dynamic differential pressure and the size of the fixed-area, sharp-edge orifice which controls the metering-out rate from the metering unit's meter-out volume.

Figure 1:
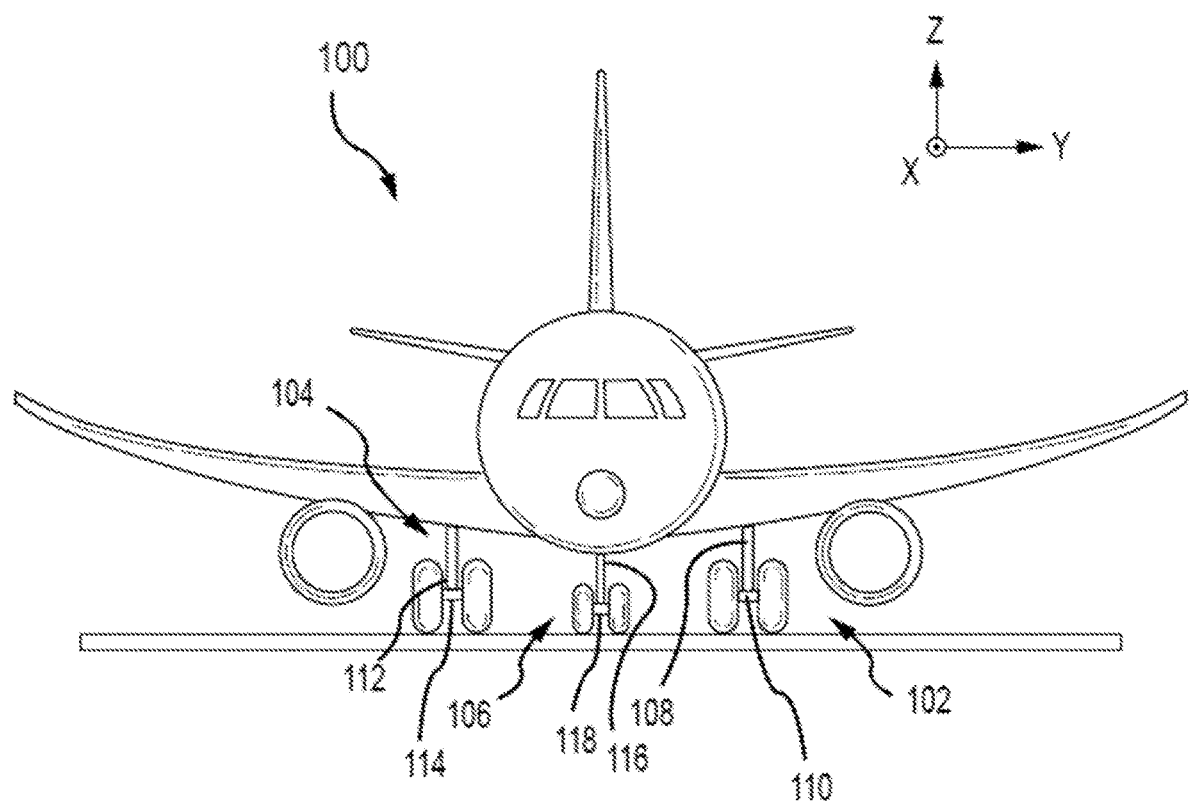
FIG. 1 illustrates an aircraft having left, right and nose landing gear assemblies and wheels mounted thereon, in accordance with various embodiments.

Referring now to FIG. 1, an aircraft 100 is illustrated, in accordance with various embodiments. In accordance with various embodiments, aircraft 100 may include one or more landing gear assemblies, such as, for example, a left landing gear assembly 102 (or port-side landing gear assembly), a right landing gear assembly 104 (or starboard-side landing gear assembly) and a nose landing gear assembly 106. Each of left landing gear assembly 102, right landing gear assembly 104, and nose landing gear assembly 106 may support aircraft 100 when not flying, allowing aircraft 100 to taxi, takeoff, and land safely and without damage to aircraft 100. In various embodiments, left landing gear assembly 102 may include a left shock strut assembly 108 and a left wheel assembly 110, right landing gear assembly 104 may include a right shock strut assembly 112 and a right wheel assembly 114, and nose landing gear assembly 106 may include a nose shock strut assembly 116 and a nose wheel assembly 118.

Figure 2:
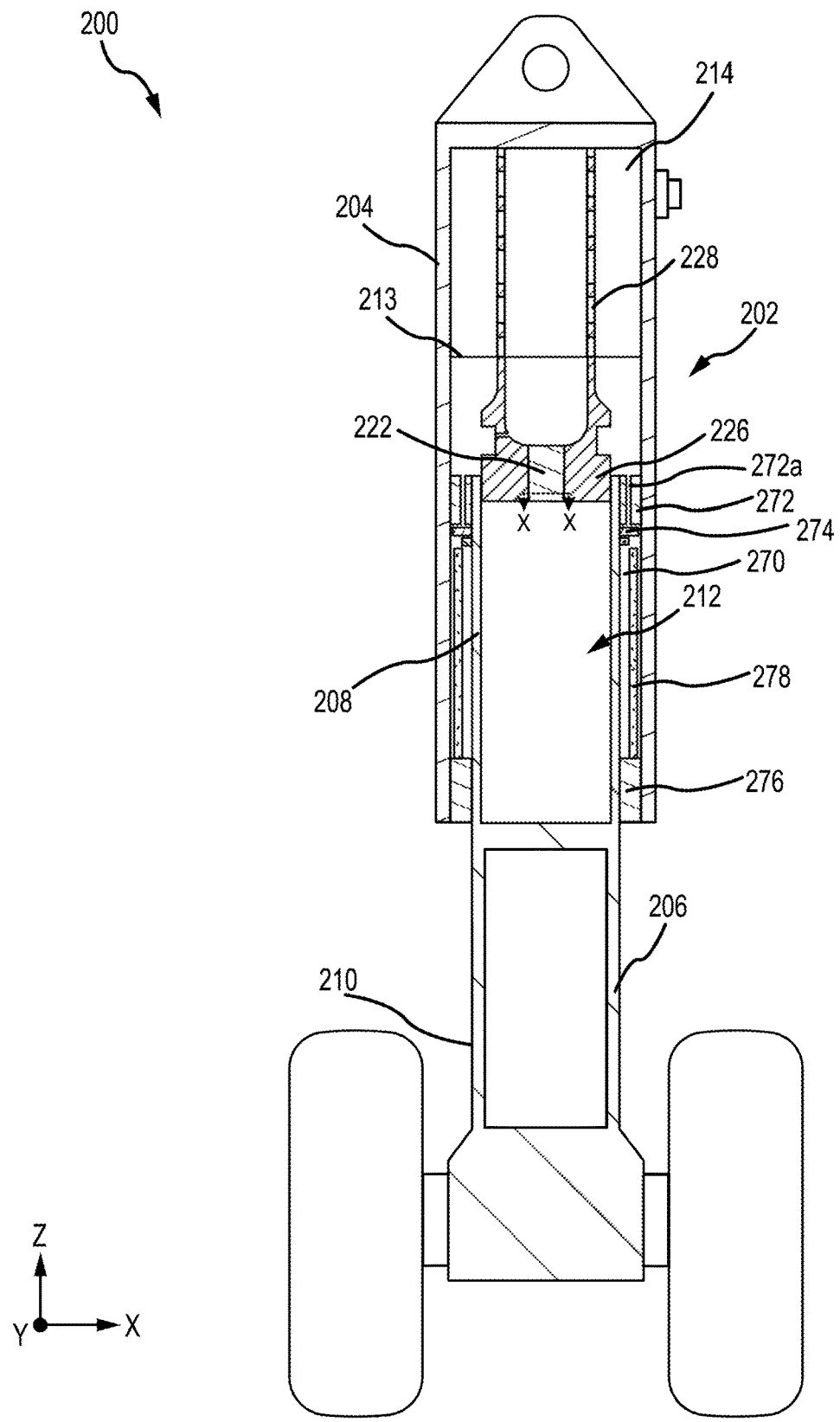
FIG. 2 illustrates a cross-sectional view of a landing gear assembly in accordance with various embodiments.

Referring now to FIG. 2, a cross-sectional view of a landing gear assembly 200, similar to the landing gear assemblies described above with reference to FIG. 1, is illustrated in accordance with various embodiments. In various embodiments, landing gear assembly 200 includes a shock strut 202, which itself may include a shock strut cylinder 204 and a shock strut piston 206. Shock strut piston 206 is operatively coupled to slide or telescope within shock strut cylinder 204. Shock strut piston 206 may include a first end 208 disposed within shock strut cylinder 204 and a second end 210 extending from shock strut cylinder 204. Shock strut cylinder 204 may be configured to receive shock strut piston 206 in a manner that allows the two components to telescope together and absorb and dampen forces transmitted thereto. FIG. 2 illustrates shock strut 202 in an extended position. When in a compressed position, shock strut piston 206 will have translated or slid a distance into shock strut cylinder 204 from that illustrated in FIG. 2.

Shock strut cylinder 204 may be divided into a liquid chamber 212 and a mixed fluid chamber 214 as indicated by a line 213. In various embodiments, a liquid, such as, for example, hydraulic fluid or oil, may be located within liquid chamber 212. Further, a gas, such as nitrogen gas ($N_2$) or air, may be located within mixed fluid chamber 214. In various embodiments, fluid may be used to indicate the presence of a liquid and/or a gas (e.g., mixed fluid chamber 214). In various embodiments, shock strut cylinder 204 and shock strut piston 206 are configured to seal (e.g., via a first seal ring) such that the liquid contained within liquid chamber 212 is prevented from leaking into mixed fluid chamber 214 as shock strut piston 206 translates relative to shock strut cylinder 204. In various embodiments, shock strut 202 includes a variable-area metering unit housing 222 configured to separate liquid chamber 212 (also referred to herein as a first chamber or a dynamic liquid chamber) from mixed fluid chamber 214 (also referred to herein as a second chamber or a mixed gas/liquid chamber). In this regard, during operation, the liquid, such as, for example, hydraulic fluid or oil, may be located within liquid chamber 212 (or the first or dynamic liquid chamber) and a mixture of a gas, such as, for example, nitrogen gas ($N_2$) or air, and the liquid may be located within mixed fluid chamber 214 (or the second or mixed gas/liquid chamber).

As described in more detail below, the shock strut 202 includes a variable-area metering unit housing 222 housed within a retainer housing 226. In various embodiments, the variable-area metering unit housing 222 includes multiple metering units, each with a metering flute (or a plurality of metering flutes) disposed along the length (e.g., along the Z-direction) of a metering pin analog. As described herein, the metering flute defines a flow channel between the metering pin analog and a metering pin aperture of an orifice plate through which liquid may travel from liquid chamber 212 to mixed fluid chamber 214 in response to shock strut 202 moving to a compressed position from an extended position. In various embodiments, the orifice plate is housed within the variable-area metering unit housing 222. In various embodiments, the orifice plate is typically annular in shape. Accordingly, the variable-area metering unit housing 222 within the retainer housing 226 is configured to restrict, but not prevent, the flow of fluid (e.g., liquid and/or gas) from liquid chamber 212 into mixed fluid chamber 214 during compression of shock strut 202. Conversely, the variable-area metering unit housing 222 within the retainer housing 226 is further configured to reduce the restriction and allow the liquid in mixed fluid chamber 214 to flow back into liquid chamber 212 during extension of shock strut 202 or when shock strut 202 is retracted into a landing gear bay.

Landing gear assembly 200, and more specifically shock strut 202, further includes a rebound chamber 270, an upper bearing 272, a rebound ring 274, a lower bearing 276, and an out-stop tube 278. Rebound chamber 270 may provide dampening for shock strut piston 206 during shock strut piston 206 extension. In various embodiments, rebound chamber 270 may be annular and located between shock strut cylinder 204 and shock strut piston 206. Upper bearing 272 and lower bearing 276 may permit shock strut piston 206 and shock strut cylinder 204 to telescope together. Upper bearing 272 may include an opening 272a through which oil may pass into and out of rebound chamber 270. Rebound ring 274 partially seals opening 272a, restricting the flow of fluid (e.g., oil and/or gas) from rebound chamber 270 into liquid chamber 212 and thereby improving the dampening effect of rebound chamber 270 during shock strut piston 206 extension.

Figure 3:
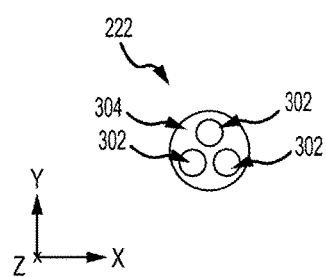
FIG. 3 illustrates a cross-sectional view along line X-X of FIG. 2, in accordance with various embodiments.

Referring now to FIG. 3 a cross-sectional view along line X-X of FIG. 2, looking down, e.g. in a z-direction, of the variable-area metering unit housing 222, similar to the variable-area metering unit housing 222 described above with reference to FIG. 2, is illustrated, in accordance with various embodiments. In various embodiments, the variable-area metering unit housing 222 includes multiple metering units 302, each of the multiple metering units 302 configured to be positioned within an orifice in an orifice plate 304. In various embodiments, each of the multiple metering units 302 are configured to fit tightly within the orifice of the orifice plate 304 such that a plurality of variable area flutes machined into an outside circumference of the metering unit, described hereafter, are the only path for a flow of liquid between liquid chamber 212 and mixed fluid chamber 214 of FIG. 2. In various embodiments, multiple metering units 302 are provide in parallel for redundancy in an event that one of the multiple metering units 302 fails while the other multiple metering units 302 operate normally to minimize impact to performance of the landing gear assembly.

Figure 4:
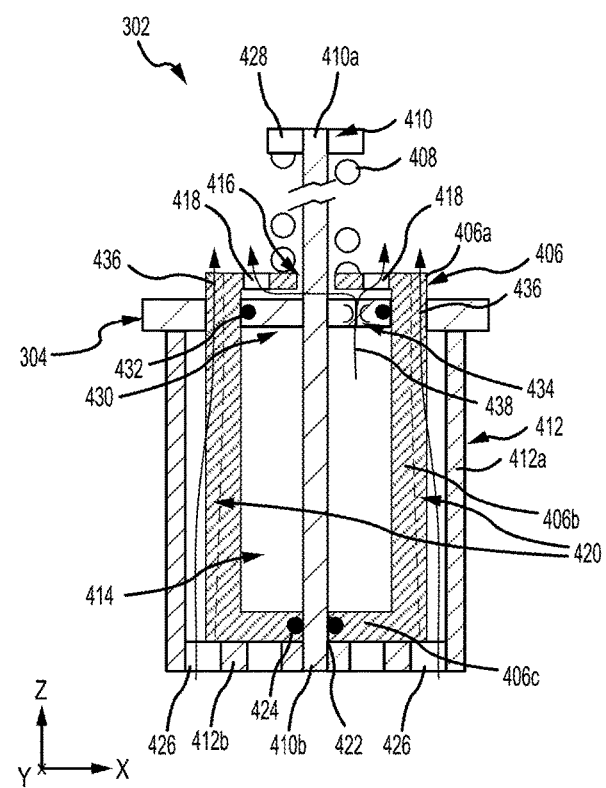
FIG. 4 illustrates a cross-sectional side view of a metering unit in accordance with various embodiments.

Referring now to FIG. 4, a cross-sectional side view, e.g. in a y-direction, of one metering unit 302 is illustrated, in accordance with various embodiments. In various embodiments, the metering unit 302 includes metering pin analog 406, return spring 408, translation shaft 410, and metering pin housing 412. In various embodiments, metering pin analog 406 includes a top portion 406a, a side portion 406b, and a bottom portion 406c that form an inner chamber 414. In various embodiments, the inner chamber 414 is filled with a meter-out volume of liquid, such as, for example, hydraulic fluid or oil. In various embodiments, the top portion 406a is configured to be coupled to a first end, i.e. a top end, of the side portion 406b. In various embodiments, the top portion 406a has an annular configuration with a void 416 that allows the translation shaft 410 to be positioned within the inner chamber 414. In various embodiments, the top portion 406a further includes a plurality of additional voids 418 that provide for the flow of liquid between inner chamber 414 and mixed fluid chamber 214 of FIG. 2. In various embodiments, the side portion 406b has a cylindrical configuration with a plurality of variable area flutes 420 machined into an outer circumference of the side portion 406b. In various embodiments, the variable area flutes 420 have a first area at a first end, i.e. a top end, of the side portion 406b that transitions to a second area at a second end, i.e. a bottom end, of the side portion 406b. In that regard, the first area is greater than the second area (or vice versa depending on shock strut dynamics of the application). In various embodiments, the bottom portion 406c is configured to be coupled to a second end, i.e. a bottom end, of the side portion 406b. In various embodiments, the bottom portion 406c has an annular configuration with a void 422 that allows the translation shaft 410. In various embodiments, the bottom portion 406c is configured to be fluidly sealed to the translation shaft 410 via seal 424 positioned within the void 422.

In various embodiments, the metering pin analog 406 is configured to be positioned within metering pin housing 412. In various embodiments, the metering pin housing 412 includes a side portion 412a and a bottom portion 412b. In various embodiments, the side portion 412a has a cylindrical configuration. In various embodiments, a first end, i.e. a top end, of the metering pin housing 412 is coupled to the orifice plate 304. In various embodiments, the bottom portion 412b is configured to be coupled to a second end, i.e. a bottom end, of the side portion 412a. In various embodiments, the bottom portion 412b has an annular configuration with a plurality of voids 426 that provide for the flow of liquid between liquid chamber 212 and mixed fluid chamber 214 of FIG. 2.

In various embodiments, the translation shaft 410 includes a first end 410a, i.e. a top end, and a second end 410b, i.e. a bottom end. In various embodiments, the second end 410b is configured to be coupled to the bottom portion 412b of the metering pin housing 412. In various embodiments, the first end 410a is configured to be coupled to spring retention plate 428. In various embodiments, the spring retention plate 428 has an annular configuration. In various embodiments, the return spring 408 is positioned around an outer circumference of the translation shaft 410 between a bottom edge of the spring retention plate 428 and a top edge of the top portion 406a of metering pin analog 406 and is configured to force the metering pin analog 406 back to its original position when the shock strut 202 of FIG. 2 moves to an extended position from a compressed position. In various embodiments, the translation shaft 410 further includes a metering plate 430 positioned between the first end 410a and the second end 410b within the inner chamber 414 of the metering pin analog 406. In various embodiments, the metering plate 430 has an annular configuration. In various embodiments, the metering plate 430 is configured to be fluidly sealed to an inside of the side portion 406b of the metering pin analog 406 via seal 432 positioned within the metering plate 430. In various embodiments, the metering plate 430 is further configured to include an orifice 434. In various embodiments, the orifice 434 is a fixed sharp-edged orifice. In various embodiments, the orifice 434 is configured to control how fast the metering pin analog 406 translates about the translation shaft 410 in a z-direction with respect to shock strut differential pressure.

In that regard, in response to shock strut 202 of FIG. 2 moving to a compressed position from an extended position, orifice 434 is sized such that, in various embodiments, for a given load pressure that is generated in the liquid chamber 212 of FIG. 2, the same load pressure is sensed by the annular region of the bottom portion 406c of metering pin analog 406. Accordingly, in various embodiments, for a given load pressure that is generated in the liquid chamber, fluid in the liquid chamber is forced through the variable area flutes 420 machined into an outer circumference of the side portion 406b of the metering pin analog 406 as indicated by arrows 436 and, at a same time, the same load pressure sensed by the annular region of the bottom portion 406c of metering pin analog 406 forces liquid in the inner chamber 414 of the metering pin analog 406 to be forced out through orifice 434 and the additional voids 418 as indicated by arrows 438. In various embodiments, as the metering pin traverses upward in the positive z-direction, the area for fluid flow between liquid chamber 212 and mixed fluid chamber 214 of FIG. 2 provided by the variable area flutes 420 machined into an outer circumference of the side portion 406b transitionally reduces thereby controlling the rate of translation of the shock strut piston 206 into shock strut cylinder 204 of FIG. 2.

In various embodiments, in response to shock strut 202 of FIG. 2 moving to an extended position from a compressed position, load pressure sensed by the annular region of the bottom portion 406c of metering pin analog 406 ceases and liquid flows back into the inner chamber 414 of the metering pin analog 406 through orifice 434 in an opposite direction of that indicated by arrows 438. In that regard, liquid also flows back into the liquid chamber 212 through the variable area flutes 420 in an opposite direction of that indicated by arrows 436.

Figure 5:
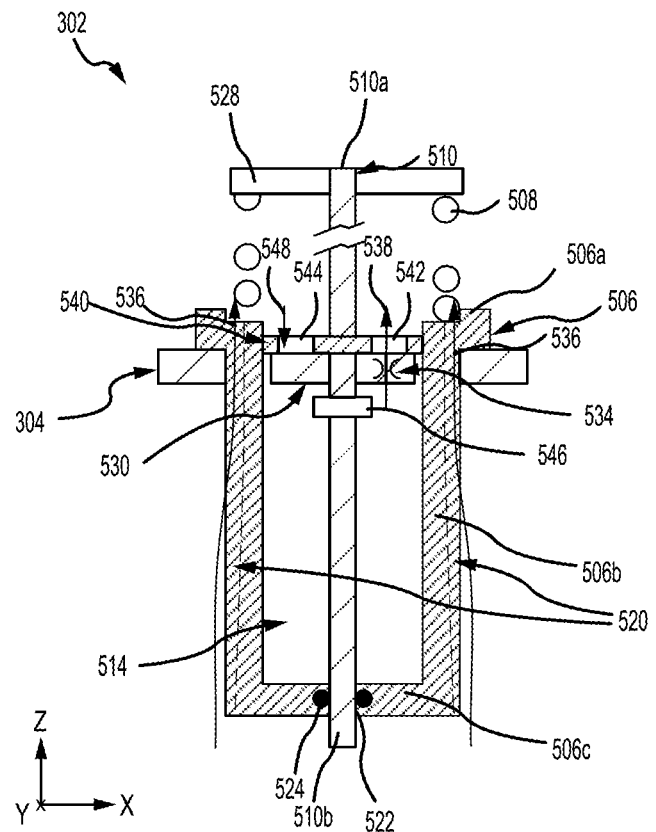
FIG. 5 illustrates a cross-sectional side view of a metering unit in accordance with various embodiments.

Referring now to FIG. 5, a cross-sectional side view, e.g. in a y-direction, of one metering unit 302 is illustrated, in accordance with various embodiments. In various embodiments, the metering unit 302 includes metering pin analog 506, return spring 508, and translation shaft 510. In various embodiments, metering pin analog 506 includes a top portion 506a, a side portion 506b, and a bottom portion 506c that form an inner chamber 514. In various embodiments, the inner chamber 514 is filled with a meter-out volume of liquid, such as, for example, hydraulic fluid or oil. In various embodiments, the top portion 506a is configured to be coupled to a first end, i.e. a top end, of the side portion 506b. In various embodiments, the top portion 506a has an annular configuration and is configured to rest on the orifice plate 304 when the shock strut 202 of FIG. 2 is in an extended position. In various embodiments, the side portion 506b has a cylindrical configuration with a plurality of variable area flutes 520 machined into an outer circumference of the side portion 506b. In various embodiments, the variable area flutes 520 have a first area at a first end, i.e. a top end, of the side portion 506b that transitions to a second area at a second end, i.e. a bottom end, of the side portion 506b. In that regard, the first area is greater than the second area (or vice versa depending on shock strut dynamics of the application). In various embodiments, the bottom portion 506c is configured to be coupled to a second end, i.e. a bottom end, of the side portion 506b. In various embodiments, the bottom portion 506c has an annular configuration with a void 522 that allows for the translation shaft 510. In various embodiments, the bottom portion 506c is configured to be fluidly sealed to the translation shaft 510 via seal 524 positioned within the void 522.

In various embodiments, the translation shaft 510 includes a first end 510a, i.e. a top end, and a second end 510b, i.e. a bottom end. In various embodiments, the second end 510b is configured to be inserted through the bottom portion 506c of the metering pin analog 506. In various embodiments, the first end 510a is configured to be coupled to spring retention plate 528. In various embodiments, the spring retention plate 528 has an annular configuration. In various embodiments, the return spring 508 is positioned around an outer an outer circumference of the translation shaft 510 between a bottom edge of the spring retention plate 528 and a top edge of the top portion 506a of metering pin analog 506 and is configured to force the metering pin analog 506 back to its original position when the shock strut 202 of FIG. 2 moves to an extended position from a compressed position. In various embodiments, the translation shaft 510 further includes a flow plate 540 positioned between the first end 510a and the second end 510b within the inner chamber 514 of the metering pin analog 506. In various embodiments, the flow plate 540 has an annular configuration. In various embodiments, the flow plate 540 is further configured to include a first orifice 542 and a second orifice 544. In various embodiments, the translation shaft 510 further includes a metering plate 530 positioned between the flow plate 540 and the second end 510b within the inner chamber 514 of the metering pin analog 506. In various embodiments, the metering plate 530 has an annular configuration. In various embodiments, the metering plate 530 is configured to translate about the translation shaft 510 between the flow plate 540 and a stop 546. In various embodiments, the metering plate 530 is further configured to include an orifice 534. In various embodiments, the orifice 534 is a fixed sharp-edged orifice. In various embodiments, the orifice 534 is configured to control how fast the metering pin analog 506 translates about the translation shaft 510 in a z-direction with respect to shock strut differential pressure.

In that regard, in response to shock strut 202 of FIG. 2 moving to a compressed position from an extended position, in various embodiments, for a given load pressure that is generated in the liquid chamber 212 of FIG. 2, the same load pressure is sensed by the annular region of the bottom portion 506c of metering pin analog 506. Accordingly, in various embodiments, for a given load pressure that is generated in the liquid chamber, fluid in the liquid chamber is forced through the variable area flutes 520 machined into an outer circumference of the side portion 506b of the metering pin analog 506 as indicated by arrows 536 and, at a same time, the same load pressure sensed by the annular region of the bottom portion 506c of metering pin analog 506 forces liquid in the inner chamber 514 of the metering pin analog 506 to translate metering plate 530 upward, i.e. in a positive z-direction, until a top surface of the metering plate 530 contacts a bottom surface of the flow plate 540 thereby sealing off the second orifice 544. In that regard, in various embodiments, once the top surface of the metering plate 530 contacts the bottom surface of the flow plate 540, the liquid in the inner chamber 514 is forced through the orifice 534 and the first orifice 542 in the flow plate 540 as indicated by arrows 538. In various embodiments, the orifice 534 is sized such that, as the metering pin analog 506 traverses upward in the positive z-direction, the area for fluid flow between liquid chamber 212 and mixed fluid chamber 214 of FIG. 2 provided by the variable area flutes 520 machined into an outer circumference of the side portion 506b transitionally reduces thereby controlling the rate of translation of the shock strut piston 206 into shock strut cylinder 204 of FIG. 2.

In various embodiments, in response to shock strut 202 of FIG. 2 moving to an extended position from a compressed position, load pressure sensed by the annular region of the bottom portion 506c of metering pin analog 506 ceases, metering plate 530 translates downward, i.e. in a negative z-direction, until a bottom surface of the metering plate 530 contacts a top surface of stop 546, and liquid flows back into the inner chamber 514 of the metering pin analog 506 through the second orifice 544 of flow plate 540 as indicated by arrow 548. In that regard, liquid also flows back into the liquid chamber 212 through the variable area flutes 520 in an opposite direction of that indicated by arrows 536.

Figure 6:
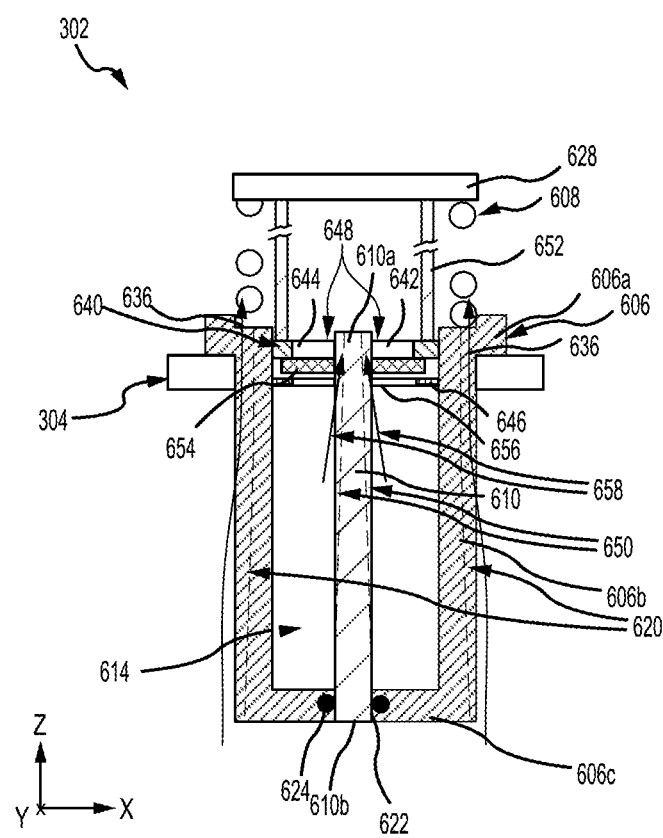
FIG. 6 illustrates a cross-sectional side view of a metering unit in accordance with various embodiments.

Referring now to FIG. 6, a cross-sectional side view, e.g. in a y-direction, of one metering unit 302 is illustrated, in accordance with various embodiments. In various embodiments, the metering unit 302 includes metering pin analog 606, return spring 608, and translation shaft 610. In various embodiments, metering pin analog 606 includes a top portion 606a, a side portion 606b, and a bottom portion 606c that form an inner chamber 614. In various embodiments, the inner chamber 614 is filled with a meter-out volume of liquid, such as, for example, hydraulic fluid or oil. In various embodiments, the top portion 606a is configured to be coupled to a first end, i.e. a top end, of the side portion 606b. In various embodiments, the top portion 606a has an annular configuration and is configured to rest on the orifice plate 304 when the shock strut 202 of FIG. 2 is in an extended position. In various embodiments, the side portion 606b has a cylindrical configuration with a plurality of variable area flutes 620 machined into an outer circumference of the side portion 606b. In various embodiments, the variable area flutes 620 have a first area at a first end, i.e. a top end, of the side portion 606b that transitions to a second area at a second end, i.e. a bottom end, of the side portion 606b. In that regard, the first area is greater than the second area (or vice versa depending on shock strut dynamics of the application). In various embodiments, the bottom portion 606c is configured to be coupled to a second end, i.e. a bottom end, of the side portion 606b. In various embodiments, the bottom portion 606c has an annular configuration with a void 622 that allows for the translation shaft 610. In various embodiments, the bottom portion 606c is configured to be fluidly sealed to the translation shaft 610 via seal 624 positioned within the void 622.

In various embodiments, the translation shaft 610 includes a first end 610a, i.e. a top end, and a second end 610b, i.e. a bottom end. In various embodiments, the translation shaft 610 includes a plurality of variable area flutes 650 around an outer circumference of the translation shaft 610. In various embodiments, the variable area flutes 650 have a first area at the first end 610a of the translation shaft 610 that transitions to a second area at the second end 610b of the translation shaft 610. In that regard, the first area is greater than the second area (or vice versa depending on shock strut dynamics of the application). Accordingly, in various embodiments, the variable area flutes 650 are configured to control how fast the metering pin analog 606 translates about the translation shaft 610 in a z-direction with respect to shock strut differential pressure.

In various embodiments, the second end 610b is configured to be inserted through the bottom portion 606c of the metering pin analog 606. In various embodiments, the first end 610a is configured to be coupled to a flow plate 640 positioned within the inner chamber 614 of the metering pin analog 606. In various embodiments, the flow plate 640 has an annular configuration. In various embodiments, the flow plate 640 is further configured to include a first orifice 642 and a second orifice 644. In various embodiments, the flow plate is configured to couple to a spring retention plate 628 via an orifice support tube 652. In various embodiments, both the orifice support tube 652 and the spring retention plate 628 have annular configurations. In various embodiments, the return spring 608 is positioned around an outer circumference of the orifice support tube 652 between a bottom edge of the spring retention plate 628 and a top portion 606a of the metering pin analog 606 and is configured to force the metering pin analog back to an original position when the shock strut 202 of FIG. 2 moves to an extended position from a compressed position. In various embodiments, the metering pin analog 606 further includes an orifice valve plate 654 positioned between the flow plate 640 and the second end 610b within the inner chamber 614 of the metering pin analog 606. In various embodiments, the orifice valve plate 654 is configured to translate about the translation shaft 610 between the flow plate 640 and a stop 646. In various embodiments, the stop 646 includes one or more orifices 656.

In that regard, in response to shock strut 202 of FIG. 2 moving to a compressed position from an extended position, in various embodiments, for a given load pressure that is generated in the liquid chamber 212 of FIG. 2, the same load pressure is sensed by the annular region of the bottom portion 606c of metering pin analog 606. Accordingly, in various embodiments, for a given load pressure that is generated in the liquid chamber, fluid in the liquid chamber is forced through the variable area flutes 620 machined into an outer circumference of the side portion 606b of the metering pin analog 606 as indicated by arrows 636 and, at a same time, the same load pressure sensed by the annular region of the bottom portion 606c of metering pin analog 606 forces liquid in the inner chamber 614 of the metering pin analog 606 to translate orifice valve plate 654 upward, i.e. in a positive z-direction, until a top surface of the orifice valve plate 654 contacts a bottom surface of the flow plate 640 thereby sealing off the first orifice 642 and the second orifice 644. In that regard, in various embodiments, once the top surface of the orifice valve plate 654 contacts the bottom surface of the flow plate 640, the liquid in the inner chamber 614 is forced through the variable area flutes 650 as indicated by arrows 658. In various embodiments, the variable area flutes 650 are sized such that, as the metering pin analog 606 traverses upward in the positive z-direction, the area for fluid flow between liquid chamber 212 and mixed fluid chamber 214 of FIG. 2 provided by the variable area flutes 620 machined into an outer circumference of the side portion 606b transitionally reduces thereby controlling the rate of translation of the shock strut piston 206 into shock strut cylinder 204 of FIG. 2.

In various embodiments, in response to shock strut 202 of FIG. 2 moving to an extended position from a compressed position, load pressure sensed by the annular region of the bottom portion 606c of metering pin analog 606 ceases, the orifice valve plate 654 translates downward, i.e. in a negative z-direction, until a bottom surface of the orifice valve plate 654 contacts a top surface of stop 646, and liquid flows back into the inner chamber 614 of the metering pin analog 606 through the first orifice 642 and the second orifice 644 of flow plate 640 and the one or more orifices 656 of the stop 646 as indicated by arrows 648. In that regard, liquid also flows back into the liquid chamber 212 through the variable area flutes 620 in an opposite direction of that indicated by arrows 636.

Thus, in various embodiments, by providing a shock strut variable-area metering unit which that mimics a traditional metering pin analog's variable flow area versus stroke, the weight of a typical shock strut is reduced by the elimination of the tradition metering pin. In various embodiments, the variable-area metering unit's shock strut operational orifice area changes as its metering pin analog moves. In various embodiments, the metering pin analog stroke of the variable-area metering unit is only a small fraction of the shock strut's stroke. However, in various embodiments, the metering pin analog's area profile is similar or approximate to a traditional metering pin since the metering pin analog's areas are a function of stroke and the metering pin analog is a function of differential pressure. Therefore, the similarity of the metering pin analog to a traditional metering pin will vary depending on the loading condition. In various embodiments, the metering pin analog's movement and velocity are a function of the shock strut's dynamic differential pressure and the size of the fixed-area, sharp-edge orifice which controls the metering-out rate from the metering unit's meter-out volume.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods, and apparatus are provided herein. In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A metering unit, comprising:
   a metering pin analog; and
   a translation shaft, wherein:
   the metering pin analog is configured to translate about the translation shaft in a first direction in response to a load pressure acting on an annular region of a bottom portion of the metering pin analog, and
   the metering pin analog is configured to translate about the translation shaft in a second direction opposite the first direction in response to the load pressure ceasing, wherein the metering pin analog includes a plurality of variable area flutes machined into an outer circumference of a side portion of the metering pin analog and wherein each of the plurality of variable area flutes has a first area at a first end of the side portion that transitions to a second area at a second end of the side portion.

2. The metering unit of claim 1, wherein the metering pin analog is positioned within an orifice of an orifice plate, wherein the orifice plate is positioned within a metering unit housing, and wherein the metering unit housing is positioned between a liquid chamber and a mixed fluid chamber of a shock strut cylinder.

3. The metering unit of claim 2, wherein the load pressure is generated in the liquid chamber responsive to a shock strut piston translating a distance into the shock strut cylinder and wherein a rate of translation of the shock strut piston into the shock strut cylinder is controlled by the metering pin analog.

4. The metering unit of claim 1, wherein the metering pin analog has a cylindrical configuration defining an inner chamber defined by one or more of the bottom portion, a side portion, and a top portion.

5. The metering unit of claim 4, wherein the inner chamber is filled with a meter-out volume of liquid and wherein, as the metering pin analog translates about the translation shaft in the first direction in response to the load pressure acting on the annular region of the bottom portion of the metering pin analog, the meter-out volume of liquid is forced out of the inner chamber through at least one orifice in a metering plate within the inner chamber or a plurality of variable area flutes around an outer circumference of the translation shaft.

6. The metering unit of claim 1, further comprising:
a return spring, wherein the return spring is positioned between a retention plate and a top portion of the metering pin analog and wherein the return spring is configured to force the metering pin analog back to an original position when a shock strut moves to an extended position from a compressed position.

7. A landing gear assembly, comprising:
a shock strut cylinder;
a shock strut piston slidably disposed within the shock strut cylinder; and
a metering unit, the metering unit comprising:
a metering pin analog; and
a translation shaft, wherein:
the metering pin analog is configured to translate about the translation shaft in a first direction in response to a load pressure acting on an annular region of a bottom portion of the metering pin analog, and
the metering pin analog is configured to translate about the translation shaft in a second direction opposite the first direction in response to the load pressure ceasing, wherein the metering pin analog includes a plurality of variable area flutes machined into an outer circumference of a side portion of the metering pin analog and wherein each of the plurality of variable area flutes has a first area at a first end of the side portion that transitions to a second area at a second end of the side portion.

8. The landing gear assembly of claim 7, wherein the metering pin analog is positioned within an orifice of an orifice plate, wherein the orifice plate is positioned within a metering unit housing, and wherein the metering unit housing is positioned between a liquid chamber and a mixed fluid chamber of the shock strut cylinder.

9. The landing gear assembly of claim 8, wherein the load pressure is generated in the liquid chamber responsive to the shock strut piston translating a distance into the shock strut cylinder and wherein a rate of translation of the shock strut piston into the shock strut cylinder is controlled by the metering pin analog.

10. The landing gear assembly of claim 7, wherein the metering pin analog has a cylindrical configuration defining an inner chamber defined by one or more of the bottom portion, a side portion, and a top portion.

11. The landing gear assembly of claim 10, wherein the inner chamber is filled with a meter-out volume of liquid and wherein, as the metering pin analog translates about the translation shaft in the first direction in response to the load pressure acting on the annular region of the bottom portion of the metering pin analog, the meter-out volume of liquid is forced out of the inner chamber through at least one orifice in a metering plate within the inner chamber or a plurality of variable area flutes around an outer circumference of the translation shaft.

12. The landing gear assembly of claim 7, wherein the metering unit further comprises:
a return spring, wherein the return spring is positioned between a retention plate and a top portion of the metering pin analog and wherein the return spring is configured to force the metering pin analog back to an original position when a shock strut moves to an extended position from a compressed position.

13. An aircraft, comprising:
a landing gear assembly, the landing gear assembly comprising:
a shock strut cylinder;
a shock strut piston slidably disposed within the shock strut cylinder; and
a metering unit, the metering unit comprising:
a metering pin analog; and
a translation shaft, wherein:
the metering pin analog is configured to translate about the translation shaft in a first direction in response to a load pressure acting on an annular region of a bottom portion of the metering pin analog, and
the metering pin analog is configured to translate about the translation shaft in a second direction opposite the first direction in response to the load pressure ceasing, wherein the metering pin analog includes a plurality of variable area flutes machined into an outer circumference of a side portion of the metering pin analog and wherein each of the plurality of variable area flutes has a first area at a first end of the side portion that transitions to a second area at a second end of the side portion.

14. The aircraft of claim 13, wherein the metering pin analog is positioned within an orifice of an orifice plate, wherein the orifice plate is positioned within a metering unit housing, and wherein the metering unit housing is positioned between a liquid chamber and a mixed fluid chamber of the shock strut cylinder.

15. The aircraft of claim 14, wherein the load pressure is generated in the liquid chamber responsive to the shock strut piston translating a distance into the shock strut cylinder and wherein a rate of translation of the shock strut piston into the shock strut cylinder is controlled by the metering pin analog.

* * * * *